(12) United States Patent
Ervin et al.

(10) Patent No.: US 9,097,146 B2
(45) Date of Patent: *Aug. 4, 2015

(54) FEED FORWARD CONTROL FOR ELECTRIC VARIABLE VALVE OPERATION

(71) Applicant: Ford Global Technologies, LLC, Dearborn, MI (US)

(72) Inventors: James Douglas Ervin, Novi, MI (US); Yan Wang, Ann Arbor, MI (US); Ilya Vladimir Kolmanovsky, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 22 days.

This patent is subject to a terminal disclaimer.

(21) Appl. No.: 14/063,791

(22) Filed: Oct. 25, 2013

(65) Prior Publication Data
US 2014/0048023 A1   Feb. 20, 2014

Related U.S. Application Data

(63) Continuation of application No. 12/851,831, filed on Aug. 6, 2010, now Pat. No. 8,567,359.

(51) Int. Cl.
| *F01L 1/34* | (2006.01) |
| *F01L 1/22* | (2006.01) |
| *F02D 41/14* | (2006.01) |
| *F02D 41/00* | (2006.01) |
| *F01L 9/04* | (2006.01) |
| *F01L 13/00* | (2006.01) |

(52) U.S. Cl.
CPC ............... *F01L 1/22* (2013.01); *F01L 13/0015* (2013.01); *F02D 41/0002* (2013.01); *F02D 41/1498* (2013.01); *F01L 9/04* (2013.01); *F01L 2013/0073* (2013.01); *F01L 2013/103* (2013.01); *F02D 2041/001* (2013.01); *F02D 2041/141* (2013.01); *F02D 2250/18* (2013.01); *F02D 2250/28* (2013.01); *Y02T 10/42* (2013.01)

(58) Field of Classification Search
CPC ............... F01L 1/22; F01L 9/04; F01L 25/08; F01L 2009/04; F01L 2013/103
USPC ...................... 123/90.15, 90.17, 90.16, 90.11
See application file for complete search history.

(56) References Cited

U.S. PATENT DOCUMENTS

| 6,216,655 B1 | 4/2001 | Yoshiki et al. |
| 7,047,922 B2 | 5/2006 | Asada et al. |
| 7,135,834 B1 | 11/2006 | Melfi et al. |
| 7,246,582 B2 | 7/2007 | Miyakoshi |

(Continued)

FOREIGN PATENT DOCUMENTS

CN   101457664 A   6/2009

OTHER PUBLICATIONS

Partial Translation of Office Action of Chinese Application No. 201110209091.6, Issued Mar. 2, 2015, State Intellectual Property Office of PRC, 14 pages.

*Primary Examiner* — Ching Chang
(74) *Attorney, Agent, or Firm* — Julia Voutyras; Alleman Hall McCoy Russell & Tuttle LLP

(57) ABSTRACT

Periodic torque disturbances that affect cylinder valve operation are anticipated, and an appropriate reaction torque is provided by an electric motor to counteract the periodic torque disturbances to position a cylinder valve at a desired position.

19 Claims, 4 Drawing Sheets

(56) References Cited

U.S. PATENT DOCUMENTS

| | | |
|---|---|---|
| 7,380,529 B2 | 6/2008 | Finis et al. |
| 7,835,848 B1 | 11/2010 | Rollinger et al. |
| 7,861,682 B2 | 1/2011 | Berger |
| 8,046,154 B2 | 10/2011 | Yoon |
| 8,567,359 B2 * | 10/2013 | Ervin et al. ............... 123/90.15 |
| 2008/0218930 A1 | 9/2008 | Nishida et al. |
| 2009/0288621 A1 | 11/2009 | Mikawa et al. |
| 2011/0000450 A1 | 1/2011 | Shiino et al. |

* cited by examiner

FEED FORWARD CONTROL FOR ELECTRIC VARIABLE VALVE OPERATION

CROSS REFERENCE TO RELATED APPLICATIONS

The present application is a continuation of U.S. patent application Ser. No. 12/851,831, filed on Aug. 6, 2010, the entire contents of which are hereby incorporated by reference for all purposes.

BACKGROUND AND SUMMARY

A variable camshaft timing (VCT) system enables adjustment of an angular position of a camshaft to vary valve timing of an engine in order to accommodate various operating conditions of the engine. For example, during low load conditions the VCT system may change the valve timing via camshaft position adjustment to increase operating efficiency and increase fuel economy. Correspondingly, during high load conditions the VCT system may change the valve timing via camshaft position adjustment to increase engine output.

In one example, a VCT system adjusts an angular position of the camshaft relative to a reference crankshaft position measurement by controlling an electric motor that is operable to vary the angular position of the camshaft. In a typical feedback control approach, an error in angular position of the camshaft is observed before the VCT system intervenes to operate the electric motor to correct for the angular error of the camshaft position.

However, the inventors have recognized several potential issues with such a feedback control system. As an example, an update rate of a camshaft position measurement is not fast enough to compensate for an angular position error observed by feedback control. As such, camshaft position adjustment to compensate for the angular position error is delayed causing a reduction in control accuracy. On the other hand, the update rate of the camshaft position measurement can be increased by installing a camshaft position sensor that includes a target having more teeth, but such a position sensor would increase the production cost of the system.

In one example, the above mentioned issues may be addressed by a method for controlling an electric motor for positioning an adjustment mechanism to vary cylinder valve operation. The method may comprise adjusting a torque output of the electric motor to counteract an anticipated periodic torque disturbance applied to the adjustment mechanism from a valvetrain source to position the adjustment mechanism at a desired position.

As an example, the adjustment mechanism may include a variable camshaft timing actuator that adjusts an angular position of a camshaft to vary cylinder valve timing. During operation, torque disturbances that occur periodically, for example, based on rotation of the camshaft can cause an angular position error of the camshaft. However, since the torque disturbances occur on a periodic basis, they can be anticipated and characterized. In one particular example, the periodic disturbance torques are used to generate a feedforward control signal to adjust the output torque of the electric motor. By adjusting the output torque of the electric motor based on the anticipated torque disturbances, camshaft angular position error can be substantially reduced or eliminated. In other words, torque can be provided by the electric motor to counteract the torque disturbances as they occur to maintain the camshaft at a desired angular position. On the other hand, in a feedback response system, a camshaft angular position error occurs before corrective adjustment is provided.

It will be understood that the summary above is provided to introduce in simplified form a selection of concepts that are further described in the detailed description, which follows. It is not meant to identify key or essential features of the claimed subject matter, the scope of which is defined by the claims that follow the detailed description. Further, the claimed subject matter is not limited to implementations that solve any disadvantages noted above or in any part of this disclosure.

BRIEF DESCRIPTION OF THE DRAWINGS

The subject matter of the present disclosure will be better understood from reading the following detailed description of non-limiting embodiments, with reference to the attached drawings, wherein.

DETAILED DESCRIPTION

The present disclosure is related to operating an electric motor to enhance position control of a valve adjustment mechanism throughout various operating conditions of an engine in order to increase cylinder valve control accuracy. More particularly, the present disclosure is related to characterizing periodic disturbances that affect a position of a valve adjustment mechanism and anticipating their occurrence by generating a feedforward control signal to compensate for the periodic disturbances to substantially reduce or eliminate position error of the valve adjustment mechanism.

The subject matter of the present disclosure is now described by way of example and with reference to certain illustrated embodiments. Components that may be substantially the same in two or more embodiments are identified coordinately and are described with minimal repetition. It will be noted, however, that components identified coordinately in different embodiments of the present disclosure may be at least partly different. It will be further noted that the drawings included in this disclosure are schematic. Views of the illustrated embodiments are generally not drawn to scale; aspect ratios, feature size, and numbers of features may be purposely distorted to make selected features or relationships easier to see.

Figure 1:
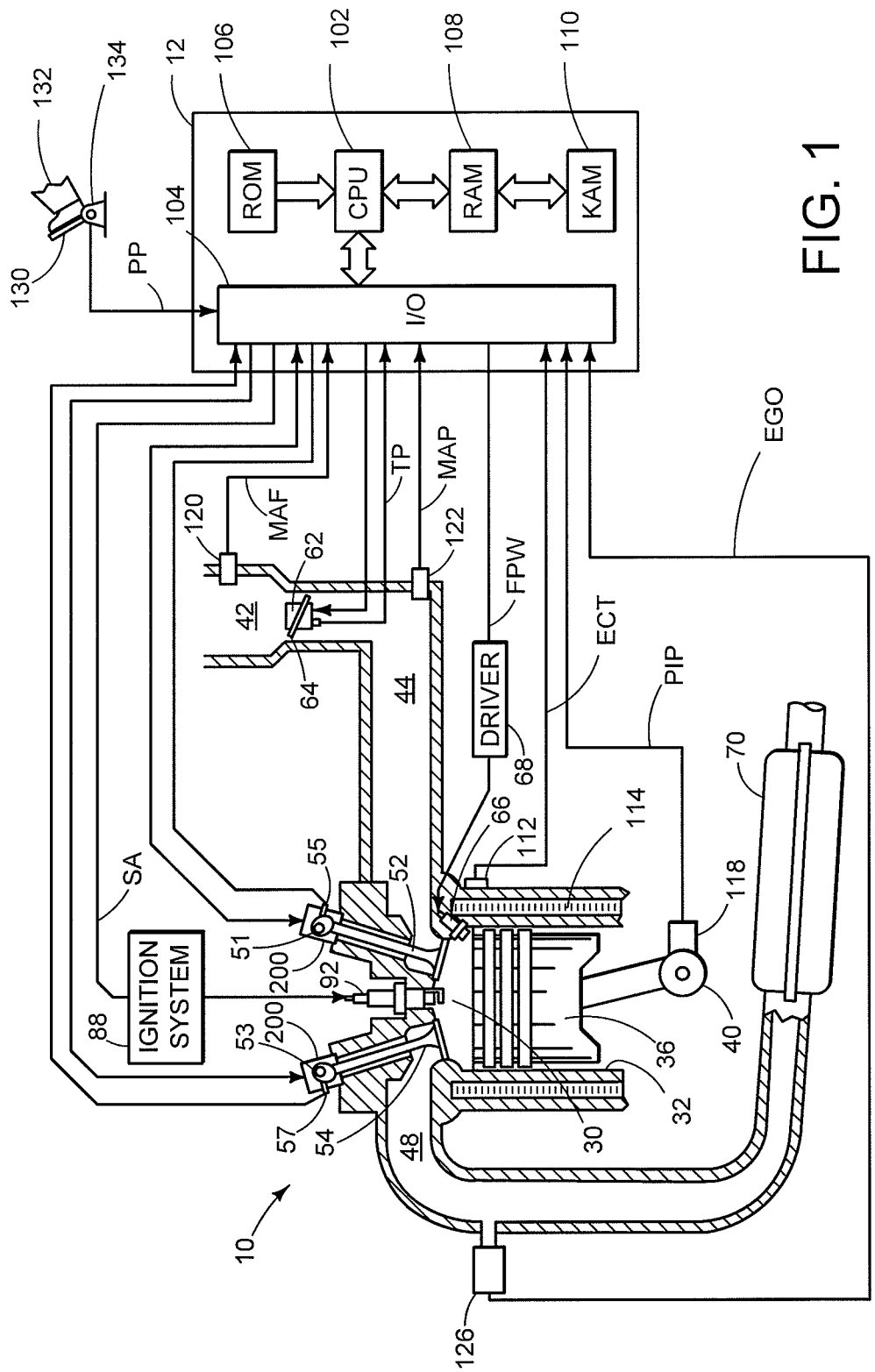
FIG. 1 is a schematic diagram of an embodiment of an engine system of the present disclosure.

FIG. 1 is a schematic diagram showing one cylinder of multi-cylinder engine 10, which may be included in a propulsion system of an automobile. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e., cylinder) 30 of engine 10 may include combustion chamber walls 32 with piston 36 positioned therein. Piston 36 may be coupled to crankshaft 40 so that reciprocating motion of the piston is translated into rotational motion of the crankshaft.

Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

In this example, intake valve 52 and exhaust valves 54 may be controlled by cam actuation via respective cam actuation systems 51 and 53. Cam actuation systems 51 and 53 may each include one or more cams. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

One or more of cam actuation system 51 and 53 may include an electric variable valve operation system 200. The electric variable valve operation system 200 may adjust the lift and/or timing of cylinder valves based on operating conditions. The variable valve operation system 200 may utilize one or more of variable cam timing (VCT), cam profile switching (CPS), variable valve timing (VVT) and/or variable valve lift (VVL) systems that may be operated by controller 12 to vary valve operation. The electric variable valve operation system 200 varies valve timing of the intake and/or exhaust valves by varying an angular position of a corresponding camshaft. In particular, the electric variable valve operation system 200 includes an electric motor 202 (shown in FIG. 2) that is operable to provide torque to rotate (or hold) the camshaft to a desired angular position. Furthermore, the electric variable valve operation system 200 varies valve lift of the intake and/or exhaust valves by varying a position of a valve lift actuator. In particular, the electric variable valve operation system 200 includes an electric motor 220 (shown in FIG. 2) that is operable to provide torque output to position (or hold) the valve lift actuator at a desired position. The electric variable valve operation system 200 will be discussed in further detail below with reference to FIG. 2.

Fuel injector 66 is shown coupled directly to combustion chamber 30 for injecting fuel directly therein in proportion to the pulse width of signal FPW received from controller 12 via electronic driver 68. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail. In some embodiments, combustion chamber 30 may alternatively or additionally include a fuel injector arranged in intake passage 44 in a configuration that provides what is known as port injection of fuel into the intake port upstream of combustion chamber 30.

Intake passage 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass air flow sensor 120 and a manifold air pressure sensor 122 for providing respective signals MAF and MAP to controller 12.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Exhaust gas sensor 126 is shown coupled to exhaust passage 48 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 70 is shown arranged along exhaust passage 48 downstream of exhaust gas sensor 126. Device 70 may be a three way catalyst (TWC), NOx trap, various other emission control devices, or combinations thereof. In some embodiments, during operation of engine 10, emission control device 70 may be periodically reset by operating at least one cylinder of the engine within a particular air/fuel ratio.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft.

As described above, FIG. 1 shows only one cylinder of a multi-cylinder engine, and that each cylinder may similarly include its own set of intake/exhaust valves, fuel injector, spark plug, etc.

Figure 2:
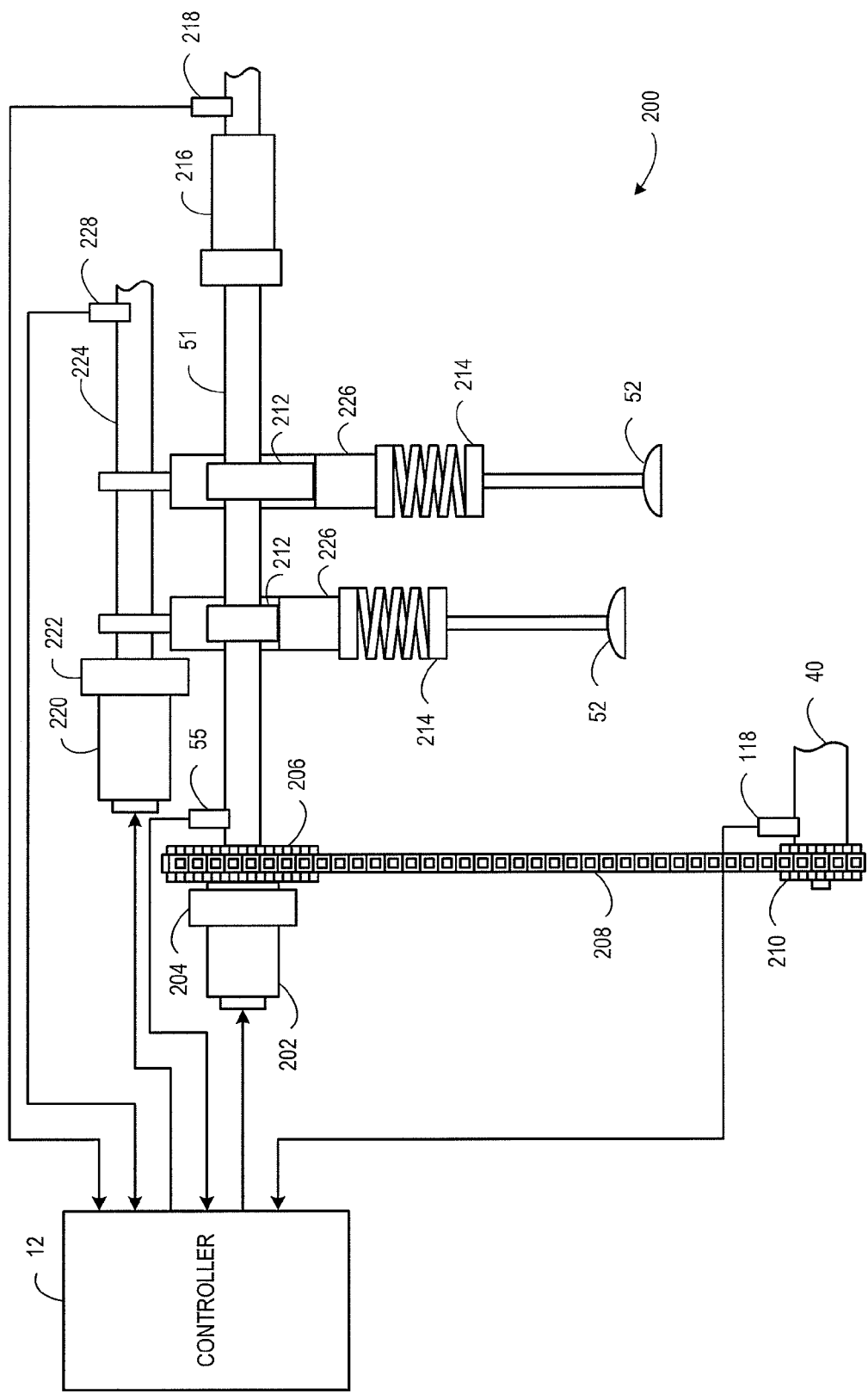
FIG. 2 is a schematic diagram of an embodiment of an electric variable valve operation system that may be implemented in the engine system of FIG. 1.

FIG. 2 is a schematic diagram of an electric variable valve operation system 200. The electric variable valve operation system 200 employs an electric motor 202 to vary valve timing and an electric motor 220 to vary valve lift of cylinder valves of engine 10 according to operating conditions. As an example, the electric variable valve operation system 200 as described herein may adjust the valve operation of intake valve 52 of engine 10. However, it will be appreciated that the variable valve operation system may vary valve lift/timing of intake and/or exhaust valves of the engine.

The electric motor 202 varies valve timing by adjusting an angular position of a camshaft 51. In particular, the electric motor 202 provides an output torque based on a camshaft position signal received from controller 12. The electric motor 202 may include a synchronous type motor that has a relatively high degree of magnetic hysteresis so as to produce a relatively constant torque output even as motor speed varies. It will be appreciated that virtually any suitable type of electric motor may be implemented in the electric variable valve operation system.

Under some conditions, the electric motor 202 provides output torque to adjust an angular position of the camshaft 51. For example, the electric motor 202 may provide output torque to transiently adjust the angular position of the camshaft to advance/retard valve timing based on operating conditions of the engine. Under some conditions, the electric motor 202 may provide output torque to maintain the camshaft 51 at a desired angular position. For example, various torque disturbances that act on the electric motor 202 and/or the camshaft 51 may be generated from actuation of engine and valvetrain components that interact with the electric motor and/or camshaft, and the electric motor may provide an output torque to counteract such torque disturbances to maintain the angular position of the crankshaft at a desired angular position.

A cam actuator mechanism 204 operatively couples the electric motor 202 to the camshaft 51. The cam actuator mechanism 204 includes a gear assembly that applies the output torque of the electric motor to the camshaft to adjust or maintain an angular position of the camshaft based on the camshaft position signal. The cam actuator mechanism 204 may adjust the angular position of the camshaft to advance/retard the valve timing. In one example, the cam actuator mechanism rotates the camshaft clockwise to retard the valve timing and/or rotates the camshaft counterclockwise to advance the valve timing. Friction in the gearing of the cam actuator mechanism 204 may cause a torque disturbance which may affect the control accuracy of the electric motor to hold the crankshaft at a desired angular position. In some embodiments, the cam actuator mechanism may be included in the electric motor.

The camshaft 51 includes a camshaft sprocket 206 that operatively couples with a crankshaft sprocket 210 of the crankshaft 40 via timing chain 208. The camshaft sprocket 206 is sized relative to the crankshaft sprocket 210 at a 2:1 ratio so that the crankshaft 40 rotates two full rotations for each rotation of the camshaft 51. Torque applied to the crankshaft 40 as a result of cylinder combustion may transfer from the crankshaft to the camshaft 51 via timing chain 208. Furthermore, the transferred torque may create a torque disturbance that transmits through the actuator mechanism 204 to the electric motor 202 which may affect the control accuracy of the electric motor to position (e.g., transiently adjust) or hold the crankshaft at a desired angular position.

The camshaft 51 includes cam lobes 212 that are located at different angular positions along the camshaft. Each of the cam lobes 212 has a profile that extends away from the center of the camshaft in a direction of the angular position. Since each of the cam lobes 212 project from the camshaft 51 in different angular directions, mass of the camshaft is dispersed away from the center of the camshaft in those angular directions. Upon rotation of the camshaft 51, the mass distributed at the different angular positions along the camshaft may create torque disturbances that act upon the actuator mechanism 204 and correspondingly the electric motor 202 which may affect the control accuracy of the electric motor to position or hold the crankshaft at a desired angular position.

Each of the cam lobes 212 has a profile that acts upon a valve spring 214 of an intake valve 52 via a valve lift actuator 226 to define a duration of a valve actuation event. In particular, as the camshaft 51 rotates each of the cam lobes 212 presses against a corresponding valve lift actuator 226 to compress a valve spring 214. The valve spring 214 becomes more compressed as the apex of the cam lobe profile rotates against the valve spring to push down the intake valve 52 to an open position. Upon further rotation of the camshaft, the apex of the cam lobe profile moves away from valve lift actuator 226 allowing the valve spring to de-compress and return intake valve 52 to a closed position. Actuation of the valve lift actuators 226, valve springs 214, and the intake valves 52 may apply torque disturbances that are transferred through the camshaft 51 and the like to the electric motor 202 which may affect the control accuracy of the electric motor to hold the crankshaft at a desired angular position.

The electric motor 220 provides output torque to adjust an angular position of an intermediate shaft 224 that adjusts a position of the valve lift actuator 226 relative to the camshaft 51 to vary valve lift. The electric motor 220 may be coupled to the intermediate shaft 224 via an actuator mechanism 222. The actuator mechanism 222 includes a gear assembly that applies the output torque of the electric motor to the intermediate shaft to adjust or maintain an angular position of the intermediate shaft based on a valve lift position signal. The actuator mechanism 222 may adjust the angular position of the intermediate shaft 224 to increase/decrease the life amount of the intake valve 52 during a valve actuation event. In one example, the actuator mechanism includes a worm gear that rotates the intermediate shaft to adjust the position of the valve lift actuator relative to the camshaft. Friction in the gearing of the actuator mechanism 222 may cause a torque disturbance which may affect the control accuracy of the electric motor to position the intermediate shaft at a desired angular position. In some embodiments, the actuator mechanism may be included in the electric motor.

The position of the valve lift actuator 226 relative to the camshaft 51 defines a lift amount of an intake valve during a valve actuation event. In particular, the valve lift actuator includes a rocker arm that actuates more or less from interaction with the camshaft based on a change in position of the intermediate shaft to rotate the rocker arm towards or away from the camshaft. For example, when the rocker arm is rotated towards the camshaft, the valve lift amount may be increased. Correspondingly, when the rocker arm is rotated away from the camshaft, the valve lift amount may be decreased. The valve lift actuators 226 may interact with the intermediate shaft 224 to transmit torque disturbances to electric motor 220. For example, periodic torque disturbances created by valve lift actuator-intermediate shaft interaction during valve actuation may be transmitted to the electric motor. Furthermore, since the camshaft 51 interacts with the valve lift actuator 226, periodic torque disturbances applied to the camshaft also may be transferred to the electric motor 220 via the valve lift actuators and intermediate shaft. Such torque disturbances may affect positioning of the intermediate shaft away from a desired position resulting in valve lift amount control errors.

A camshaft-driven fuel pump 216 is mounted to the camshaft 51. Rotation of the camshaft 51 operates the fuel pump 216 to pump fuel for injection into the engine 10. In one example, the fuel pump 216 includes a lever that interacts with the camshaft as it rotates to reciprocate a pump inside the fuel pump 216 to build fuel pressure. Reciprocation of the lever of the fuel pump 216 may apply torque disturbances that are transferred to the camshaft 51 and the like which may affect the control accuracy of the electric motor to hold the crankshaft at a desired angular position. As an example, the torque disturbance from the fuel pump may be based on a pump stroke of the fuel pump (e.g., a direct injection fuel pump). The pump stroke may be adjusted to achieve a desired fuel rail pressure. Accordingly, the torque disturbance may vary as the fuel pressure and correspondingly the pump stroke of the fuel pump varies.

Torque disturbances due to camshaft-valve spring (or valve lift actuator) interaction may vary based on a state of a particular cylinder of the engine. For example, a selected cylinder may be deactivated as part of engine operation, and the intake valve may be held closed. As such, the camshaft-valve spring interaction may be modified and correspondingly the associated torque disturbance may be altered. Moreover, deactivation of a particular cylinder may affect a periodic torque disturbance differently based on the position of an associated valve relative to the camshaft.

As described above, interaction of the electric variable valve operation system 200 with the valvetrain and various other components of the engine may transfer torque disturbances, produced as a result of operation (e.g., rotation, reciprocation, etc.), to the electric motor 202 which may affect the control accuracy of the electric motor to hold the crankshaft at a desired angular position. Likewise, torque disturbances may be transferred to the electric motor 220 which may affect the control accuracy of the electric motor to hold the intermediate shaft and/or the variable valve lift actuator at a desired position. The torque disturbances may occur periodically corresponding to rotation of the camshaft, intermediate shaft, and/or crankshaft as well as reciprocation of the valve lift actuator, valve springs, valves, and/or fuel pump lever. Such disturbances may be characterized and accounted for in the camshaft position signal sent to the electric motor 202 and/or the intermediate shaft position signal sent to electric motor 220. As such, the position signals may be adjusted to vary torque output of the electric motor 202 and/or electric motor 220 to counteract such torque disturbances in order to reduce angular position error and substantially maintain the camshaft 51 and/or the intermediate shaft 224 at a desired position.

Furthermore, the electric variable valve operation system 200 includes various sensors to measure operating parameters of the valvetrain and other components that affect operation of the electric motor in order to characterize second order effects of the engine components that contribute to torque disturbances. A camshaft position sensor 55 sends a camshaft position signal to the controller 12. A crankshaft position sensor 118 sends a crankshaft position signal to the controller 12. A fuel pressure sensor 218 sends a fuel pressure signal to the controller 12. An intermediate shaft position sensor 228 sends an intermediate shaft position signal to the controller 12. These signals may be used in conjunction with signals from sensors described above with reference to FIG. 1 to characterize second order effects of the valvetrain components that contribute to torque disturbances on the electric motor 202. The camshaft position signal and/or the intermediate shaft position signal can be adjusted to counteract the second order effects to further reduce angular position error. Furthermore, some second order effects may be characterized offline, without sensor feedback.

It will be appreciated that the above described electric variable valve operation system, valvetrain, engine components, and the like are exemplary and other engine configurations may be implemented without departing from the scope of the present disclosure. For example, any suitable engine configuration that employs an electric motor to counteract anticipated periodic disturbance torque to reduce position error for variable valve control may be implemented. In some embodiments, the variable valve operation system may vary valve timing and not vary valve lift. Accordingly, the variable valve lift mechanism, including the electric motor, intermediate shaft, and valve lift actuators, may be omitted from the configuration. Note the camshaft and the intermediate shaft as well as associated intermediary components may be referred to as adjustment mechanisms for varying valve operation. Furthermore, varying valve operation may include adjusting one or more of valve timing and valve lift.

Figure 3:
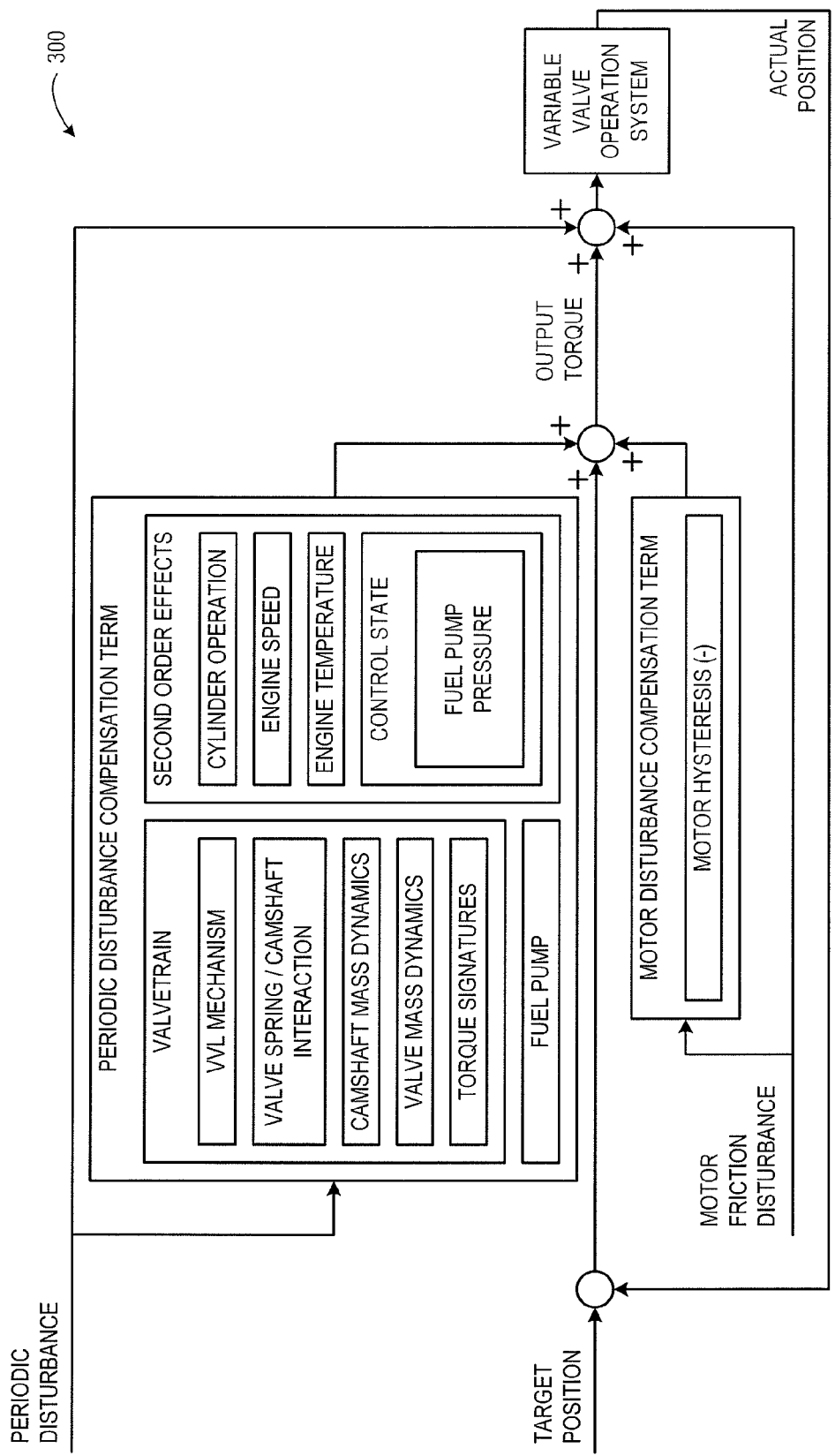
FIG. 3 is a block diagram of an embodiment of an electric motor control system.

FIG. 3 is a block diagram of an embodiment of an electric motor control system 300. The control system 300 may be implemented, for example, by controller 12. The electric motor control system 300 characterizes a position signal that is sent to the electric motor 202 and/or electric motor 220 to produce a desired output torque for adjusting (or maintaining) an angular position of the camshaft 51 and/or intermediate shaft 224 to a desired position. The electric motor control system 300 includes a feedback loop that provides the actual position of the camshaft and/or intermediate shaft that is evaluated with a target position of the camshaft and/or the intermediate shaft to produce an initial torque term for the electric motor(s).

The control system 300 characterizes periodic disturbances created by valvetrain components and other steady state components that interact with the camshaft and/or the intermediate shaft. The periodic disturbances from these components provide torque that acts upon the camshaft periodically throughout camshaft rotation, which may move the camshaft away from a desired position. Likewise, periodic torque disturbances may act upon the intermediate shat to move it away from a desired position. Since the disturbances occur according to a predefined period that is based on rotation of the camshaft and/or actuation of the cylinder valves, anticipation of the periodic disturbance torques are used to generate a periodic disturbance compensation term. The compensation term is a feedforward control signal that adjusts the torque output of the camshaft/intermediate position signal to counteract the periodic disturbances so as to substantially reduce or eliminate angular error caused by the disturbances.

The periodic disturbance compensation feedforward term may characterize periodic disturbance torques from valvetrain components. For example, valvetrain components may include the camshaft and components that interact with the camshaft to transmit torque through the camshaft that is observed at the output of the electric motor 202. Furthermore, valvetrain components may include the intermediate shaft and components that interact with the intermediate shaft to transmit torque through the intermediate shaft that is observed at the output of the electric motor 220. As discussed above, examples of valvetrain torque disturbances may include mass dynamics of the camshaft, and more particularly, the distributed mass of the cam lobes that provide torque disturbance that varies periodically based on rotation of the camshaft. As another example, valvetrain torque disturbances that may be characterized include valve mass dynamics. Valve mass dynamics may include momentum of the valve that is transferred to the camshaft during reciprocation of the valve during a valve opening/closing event. As yet another example, valve train torque disturbances may include torque disturbances produced from interaction between the valve lift actuator, the camshaft, valve springs, and intermediate shaft. For example, a periodic torque disturbance transmitted through the valve lift actuator may vary as the position of the rocker arm is adjusted relative to the camshaft to adjust valve lift.

Furthermore, the valvetrain torque disturbance may include valve spring-camshaft interaction. In other words, torque disturbances that occur from a spring force of the valve spring acting upon the camshaft during a valve opening/closing (or deactivation) event as well as friction between the valve spring, rocker arms, and the cam lobe may be characterized by the periodic disturbance compensation feedforward term. In one example where the disturbances include valve spring deflection disturbances, the amplitude of various frequency components of the disturbance may be based on an engine firing order and engine configuration (V-engine, inline engine, etc.), and whether intake and/or exhaust valves are deactivated.

For example, if intake and/or exhaust valves of cylinders are deactivated (e.g., held closed rather than opening during the combustion cycle), the torque signature of the disturbance can vary as compared to if the intake and/or exhaust valves are activated. As an example, intake/exhaust valves that are activated may generate periodic torque disturbances transmitted to the camshaft through the valve springs with each opening/closing event. The torque disturbances may be based on mass dynamics of the actuating valve as well as camshaft-valve spring (and/or rocker arm) interaction. Upon cylinder deactivation, a rocker arm that connects the camshaft to the valve may be disconnected so that the camshaft does not actuate the valve. Since the valve does not interact with the camshaft, the torque disturbance created by the mass dynamics of the valve are reduced or eliminated during cylinder deactivation. Furthermore, the torque disturbance generated by the valve spring may be reduced or eliminated during cylinder deactivation. Accordingly, the cancellation torques provided by the feedforward term may be dynamically adjusted to accommodate the different torque signatures of components associated with the cylinders as they become activated/deactivated throughout engine operation.

Note under some conditions, only one valve of a cylinder may be deactivated (e.g., an intake valve may be held closed and an exhaust valve may be opened). Further, under some conditions, only intake valves of the engine may be deactivated. In embodiments where intake valves are controlled by the same camshaft, reaction torque may be varied differently for that camshaft relative to a camshaft that controls actuation of exhaust valves. Also, under some conditions, only some cylinders may be deactivated (e.g., have both intake/exhaust valves held closed) while other cylinders are active (e.g., variable displacement operation). Upon activation/deactivation of a selected cylinder a torque signature for the torque disturbance may be added/subtracted to the periodic torque disturbance compensation term to dynamically counteract the torque disturbance and increase position control accuracy.

The periodic compensation feedforward term may characterize other steady state sources that act on the camshaft and/or the valvetrain. For example, the feedforward compensation term may include a characterization of a torque disturbance provided from a camshaft mounted fuel pump. As an example, a lever that actuates the fuel pump may ride the camshaft and rotation of the camshaft causes the lever to reciprocate. The reciprocating nature of the fuel pump lever produces a periodic torque disturbance that is anticipated by the feedforward term. The periodic torque disturbance from the fuel pump may vary based on the duration of the pump stroke of the fuel pump which varies based on fuel pressure.

Furthermore, the periodic compensation feedforward term may characterize second order effects of the valvetrain and the other steady state sources that interact with the camshaft. For example, second order effects may include a motor output torque signature, engine speed, engine temperature, and/or a control state of a component, such as a pressure level of the fuel pump, or cylinder activation/deactivation. For example, fuel pressure may be used to determine a length of the pump stroke of the fuel pump in order to suitably characterize the torque disturbance from the fuel pump. As another example, cylinder deactivation may be used to adjust characterization of torque disturbances from valve mass dynamics and/or camshaft-valve spring interaction of the deactivated cylinder to provide an accurate reaction torque to cancel the torque disturbances. As the second order effect parameters vary, the torque disturbances of the valvetrain also vary and the characterization may be adjusted accordingly.

The characterization of the periodic torque disturbances from the valvetrain, associated components, and the second order effects thereof collectively form a torque expression that is implemented as a feedforward term to generate an appropriate reaction torque for the electric motor to prevent motion of the camshaft away from a desired angular position. In other words, since the torque disturbances occur according to an established period that is based on rotation of the camshaft and the like, the feedforward term anticipates when the torque disturbances will occur and commands the electric motor(s) to provide output torque at an appropriate time to counteract the disturbances as they occur. In this way, angular position error of the camshaft can be reduced or eliminated.

The control system may include an electric motor torque disturbance that may affect control of positioning the camshaft. The electric motor torque disturbance may cause delays in delivering torque from the electric motor through the actuator mechanism to the camshaft. Such delays may be associated with internal friction of the electric motor and/or the actuator mechanism. Correspondingly, motor hysteresis may affect delivery of torque to the camshaft. As such, the electric motor torque disturbance is characterized as an electric motor disturbance compensation feedforward term that is applied with the periodic disturbance compensation feedforward term to adjust the torque output of the electric motor.

Under some conditions, the electric motor disturbance compensation feedforward term may provide torque earlier (or greater torque) to compensate for any delay (or lag) internal to the motor and/or actuator mechanism, such as due to friction or hysteresis. Under some conditions, the electric motor disturbance compensation feedforward term may reduce torque (e.g., from the periodic disturbance compensation term) because the internal friction of the motor may provide some disturbance rejection capabilities, for example, if the disturbance is suitably small. In some embodiments, the feedforward reaction torque target may be reduced by this amount within a robustness margin to reject the disturbance without generating a control error. Moreover, under some conditions where motor hysteresis exists, the motor hysteresis can be used to reduce the feed forward torque request instead of powering the motor to provide torque compensation. In this way, power consumption by the motor can be reduced.

The control system 300 provides the camshaft/intermediate shaft position signal to the electric motor(s) to generate an output torque to control angular position. The position signal is manipulated by the periodic disturbance compensation feedforward term to anticipate known periodic torque disturbances from the valvetrain, associated components, and second order effects thereof. Furthermore the position signal is manipulated by the electric motor disturbance compensation feedforward term to compensate for delays or lag, and on the other hand, reduce torque/power if the internal friction provides disturbance rejection capabilities and/or motor hysteresis exists to counteract the torque disturbances. Since the torque disturbances are anticipated, output torque may be adjusted prior to occurrence of a camshaft angular position error. In this way, camshaft control accuracy may be increased.

The configurations illustrated above enable various methods for controlling an electric motor, and more particularly, controlling an angular position of a camshaft/intermediate shaft to vary valve operation. Accordingly, some such methods are now described, by way of example, with continued reference to above configurations. It will be understood, however, that these methods, and others fully within the scope of the present disclosure, may be enabled via other configurations as well.

Figure 4:
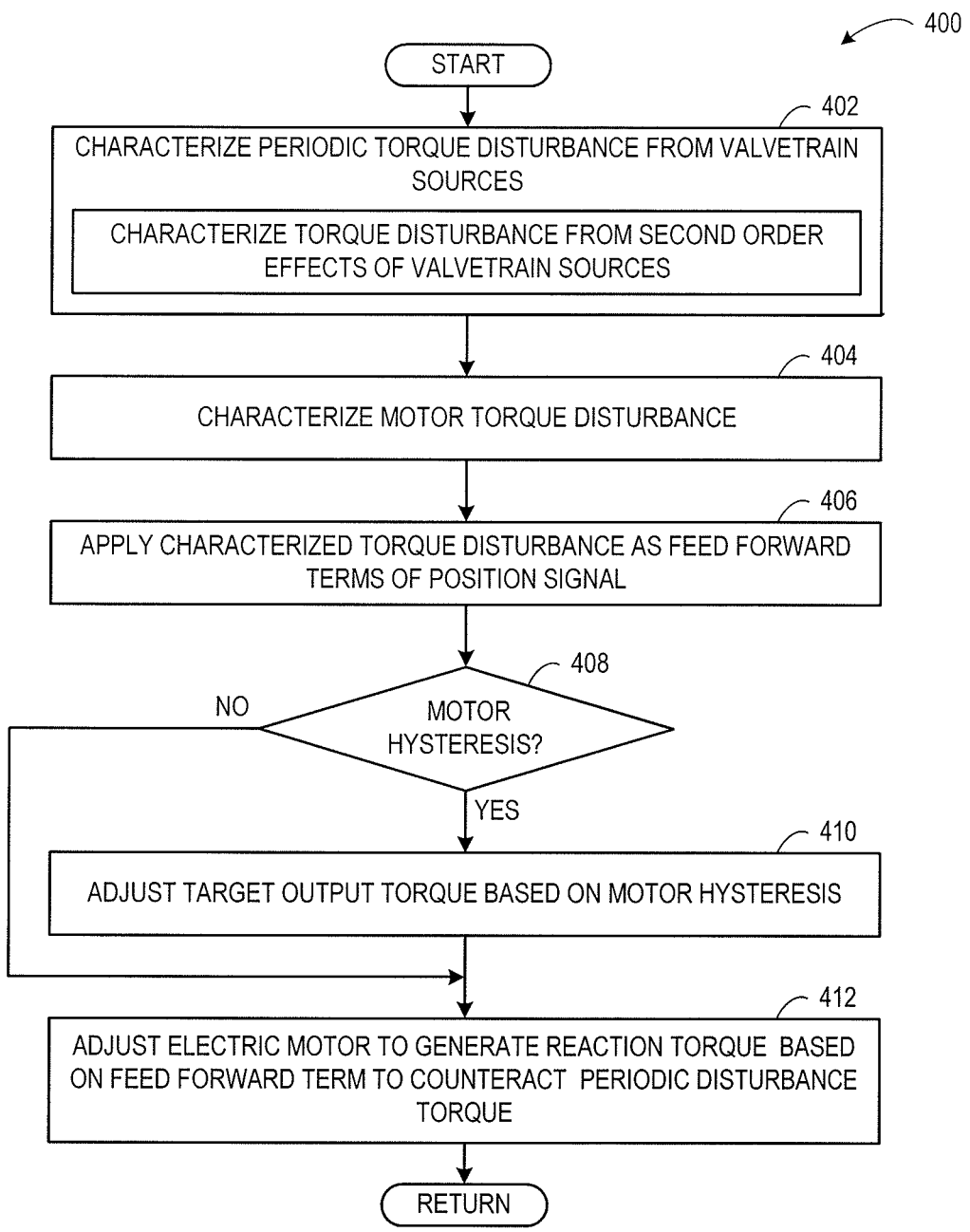
FIG. 4 is a flow diagram of an embodiment of a method for controlling an electric motor of a variable camshaft timing system.

FIG. 4 is a flow diagram of an embodiment of a method 400 for controlling an electric motor of a variable camshaft timing system. The method 400 may be executed, for example, by controller 12 to control operation of electric motor 202. The method may produce a position signal that provides a target output torque to the electric motor.

At 402, the method may include characterizing periodic torque disturbances from valvetrain sources. Valvetrain sources may include valvetrain components and other steady state sources that interact with the camshaft, intermediate shaft, and/or intermediary components. The valvetrain sources may generate periodic torque disturbances that are based on rotation of the camshaft/intermediate shaft.

Furthermore, characterizing periodic torque disturbances from the valvetrain sources may include characterizing torque disturbances from second order effects of the valvetrain sources. The second order effects may include different engine parameters, such as parameters that affect rotation of the camshaft. For example, the engine parameters may include engine speed, engine temperature, etc. As a particular example, as engine speed increases camshaft rotation increases which increases the frequency of the periodic disturbances. Also, the second order effect may include an operating state parameter of a camshaft component, such as the pressure level of a camshaft mounted fuel pump. As a particular example, if the fuel pressure is suitably high, operation of the fuel pump may change (e.g., turn off) which may affect the torque disturbance provided by the fuel pump to the camshaft.

At 404, the method may include characterizing an electric motor torque disturbance. The electric motor torque disturbance may be caused by internal friction of the motor and/or the actuator mechanism that couples the motor to the camshaft/intermediate shaft. Under some conditions, the friction may cause a lag or delay in providing torque to the camshaft/intermediate shaft. Under some conditions, the friction provides torque disturbance rejection capabilities.

At 406, the method may include applying the characterized torque disturbances as feedforward terms of the position signal that is sent to the electric motor(s). The feedforward terms anticipate the occurrence of the characterized torque disturbances and provide reaction torque at the appropriate time to counteract the torque disturbances. If conditions exist where the internal friction of the electric motor provides disturbance rejection capabilities, the electric motor torque disturbance compensation term may reduce reaction torque of the periodic torque disturbance compensation term within a robustness margin to reject the torque disturbances without generating a control error.

At 408, the method may include determining if a condition exists where motor hysteresis can be used to reduce torque of the feedforward term based on internal friction of the electric motor providing torque disturbance rejection capabilities. If it is determined that the condition exists the method moves to 410. Otherwise, the method moves to 412.

At 410, the method may include adjusting the target output torque of the position signal based on the hysteresis of the electric motor. For example, the output torque may be reduced due to the hysteresis of the motor.

At 412, the method may include adjusting the electric motor to generate reaction torque applied to the camshaft based on the feedforward terms. The electric motor is adjusted based on the camshaft position signal which is sent according to the feedforward terms at the appropriate time to counteract the periodic torque disturbances.

By anticipating known periodic torque disturbances with a feedforward term that characterizes such torque disturbances, the electric motor can provide reaction torque at the appropriate time to counteract the torque disturbances to thereby reduce angular position error of the camshaft position. In this way, camshaft hold control can be enhanced relative to systems that merely provide feedback control which may be delayed. Moreover, the method may be applied during transient adjustment of the camshaft/intermediate shaft to reduce position errors from periodic torque disturbances.

Furthermore, by compensating for disturbances from the internal friction of the motor and variable valve operation system components, the periodic torque disturbance compensation feedforward term can be suitably adjusted so as not to overcompensate for torque disturbances. In this way, angular position control error can be reduced. Moreover, by using hysteresis of the motor to reduce the reaction torque of the periodic disturbance compensation term, the electric motor does not need to use additional power to provide the torque adjustment. In this way, power consumption may be reduced.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system. It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for controlling first and second electric motors that vary cylinder valve operation through a valve adjustment mechanism and an actuator mechanism, respectively, comprising:

adjusting a torque output of the first and second electric motors to counteract an anticipated periodic torque disturbance applied to the valve adjustment mechanism and the actuator mechanism from a valvetrain source to position the valve adjustment mechanism and the actuator mechanism at desired positions.

2. The method of claim 1, wherein adjusting the torque output is performed during a transient.

3. The method of claim 1, wherein the valve adjustment mechanism includes a variable cam timing and the valve adjustment mechanism includes a variable valve lift actuator.

4. The method of claim 1, wherein the second electric motor is coupled to an intermediate shaft and a variable valve lift actuator.

5. The method of claim 4, wherein the first electric motor adjusts an advanced/retarded angular position of a camshaft.

6. The method of claim 1, further comprising:

adjusting the torque output of one of the first and second electric motors by adding a dynamic motor output torque signature responsive to cylinder activation/deactivation.

7. The method of claim 1, wherein adjusting the torque output includes adjusting the torque output to cancel periodic cylinder valve-spring disturbance torques, the periodic cylinder valve-spring disturbance torques being based on engine speed and whether cylinder valves are deactivated.

8. The method of claim 1, wherein adjusting the torque output is performed at an appropriate time to counteract the anticipated periodic torque disturbance prior to the anticipated periodic torque disturbance causing a position error away from the desired position.

9. The method of claim 1, wherein the anticipated periodic torque disturbance is based on camshaft mass dynamics.

10. The method of claim 1, wherein the anticipated periodic torque disturbance is based on valve mass dynamics.

11. The method of claim 1, wherein the anticipated periodic torque disturbance is based on variable valve lift actuator mass dynamics.

12. The method of claim 1, wherein the anticipated periodic torque disturbance is based on a camshaft-valve spring interaction.

13. An engine system comprising:

a valve adjustment mechanism to vary operation of an intake or exhaust valve;

an intermediate shaft coupled to a valve lift adjustment mechanism;

a first electric motor operable to adjust a position of the valve adjustment mechanism;

a second electric motor to adjust the valve lift adjustment mechanism through the intermediate shaft; and a controller for adjusting a torque output of the first and second electric motors to counteract an anticipated periodic torque disturbance applied from a valvetrain source to position the valve adjustment mechanism and the valve lift adjustment mechanism at desired positions.

14. The system of claim 13, wherein the valve lift adjustment mechanism includes a worm gear coupled to the intermediate shaft.

15. The system of claim 14, wherein the valve adjustment mechanism includes a variable camshaft timing actuator that varies an angular position of a camshaft to vary timing of the intake or exhaust valve.

16. The system of claim 13, wherein the anticipated periodic torque disturbance is based on one or more of camshaft mass dynamics, valve mass dynamics, variable valve lift actuator mass dynamics, and camshaft-valve spring interaction that vary periodically based on rotation of a camshaft, and vary according to second order effects of the valvetrain source including one or more of engine speed, engine temperature, and cylinder deactivation.

17. The system of claim 13, further comprising:

a camshaft mounted fuel pump operable based on rotation of a camshaft.

18. A variable valve lift system comprising:

a camshaft rotatable to actuate an intake or exhaust valve;

an electric motor operable to adjust an angular position of the camshaft via an intermediate shaft; and a controller for adjusting electric motor torque output based on an anticipated periodic torque disturbance from a camshaft source, at an appropriate time, prior to the anticipated periodic torque disturbance causing a position error, to counteract the anticipated periodic torque disturbance.

19. The system of claim 18, wherein the intermediate shaft adjusts valve lift via a worm gear.

* * * * *